Nov. 17, 1970  J. L. DICKMANN ET AL  3,540,326
PIPE TONG HEAD
Filed Dec. 4, 1967  6 Sheets-Sheet 1
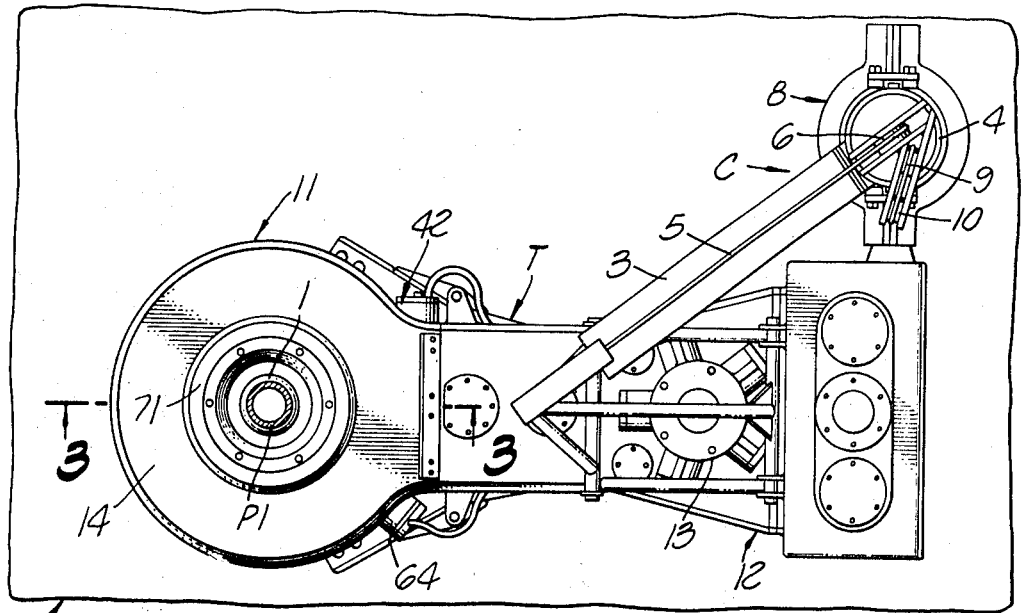
FIG. 1.
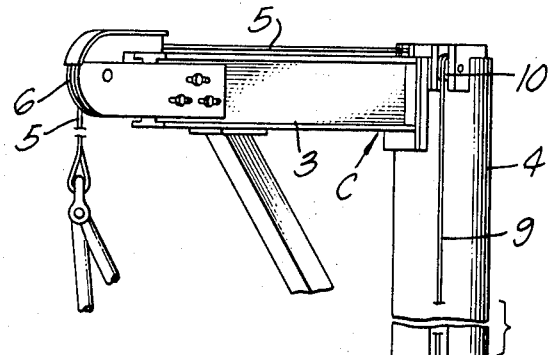
FIG. 2.
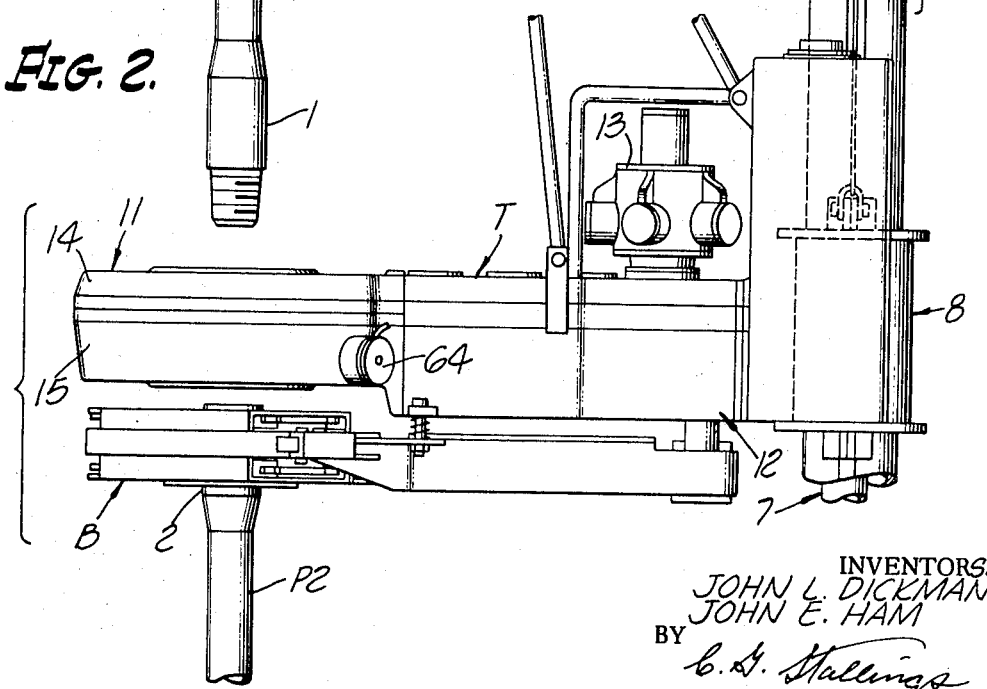
INVENTORS.
JOHN L. DICKMANN
JOHN E. HAM
BY
C. G. Stallings
ATTORNEY

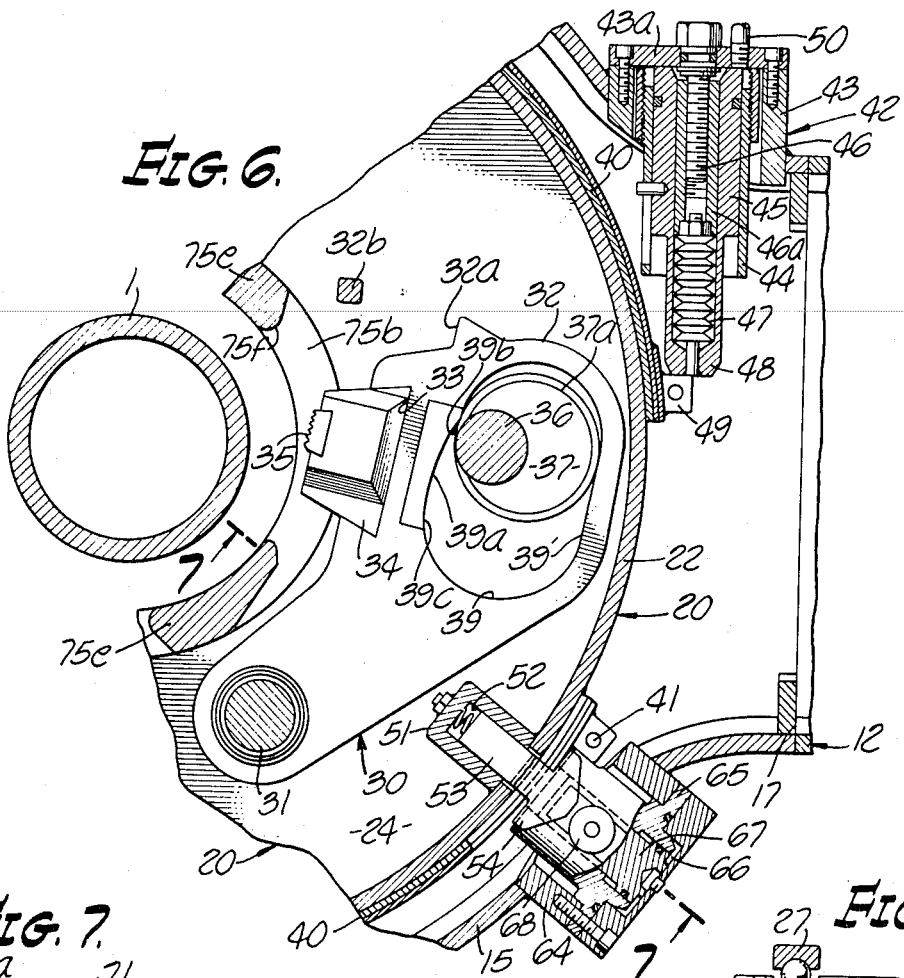

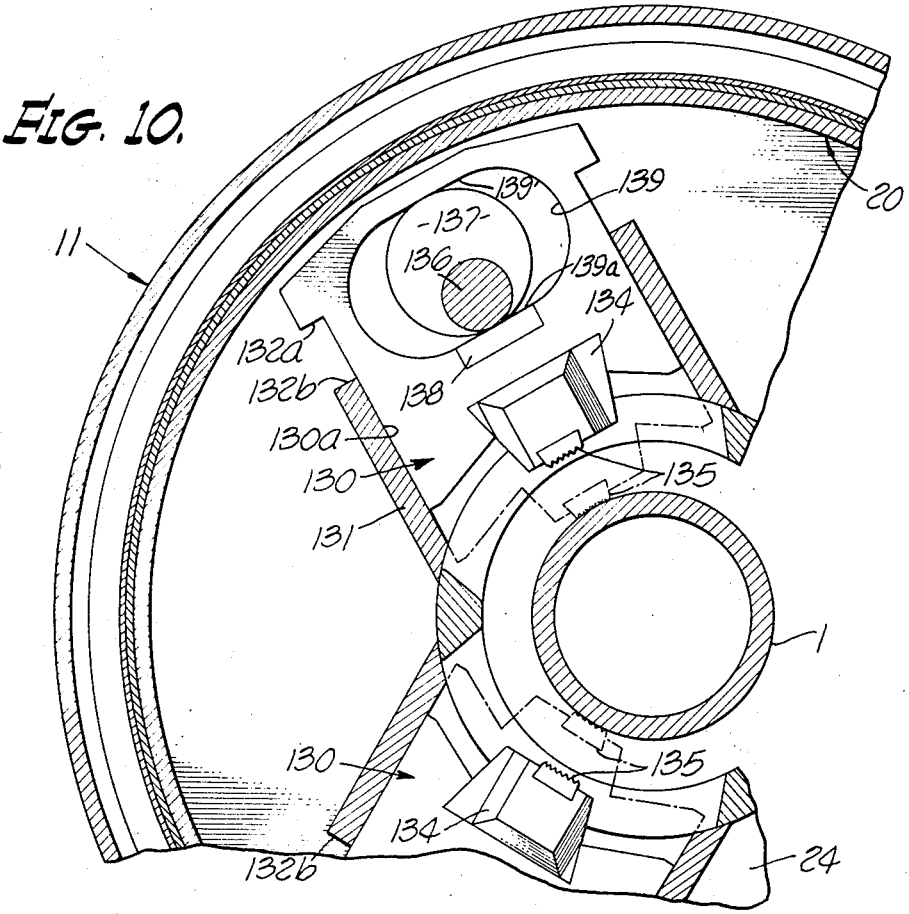
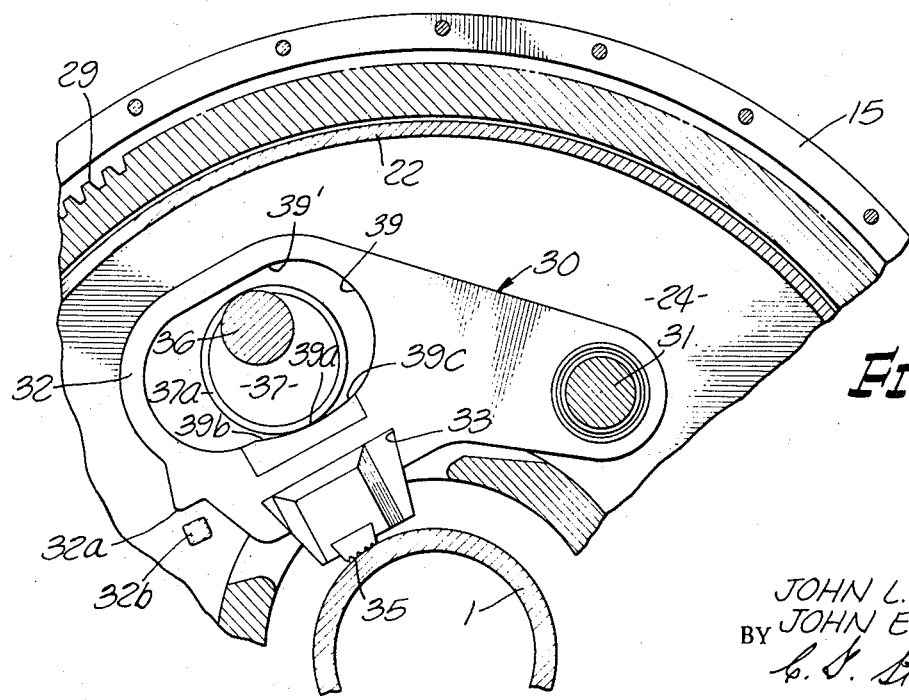

United States Patent Office 3,540,326
Patented Nov. 17, 1970

3,540,326
PIPE TONG HEAD
John L. Dickmann, Whittier, and John E. Ham, Long Beach, Calif., assignors to Byron Jackson Inc., Long Beach, Calif., a corporation of Delaware
Filed Dec. 4, 1967, Ser. No. 687,830
Int. Cl. B25b 17/00
U.S. Cl. 81—57.18   21 Claims

ABSTRACT OF THE DISCLOSURE

A pipe gripping and rotating head in a power well pipe tong assembly, the gripping jaws of which are moved toward and away from a pipe by eccentrics, operable in opposite directions to make up and break out pipe joints, the reverse stop for the inner ring being remotely operable, and the brake means for the inner ring also being remotely adjustable.

BACKGROUND OF THE INVENTION

The present invention relates to power pipe tongs, and more particularly to power pipe tongs of the type employed to make up and break out the joints or couplings in well pipe, as stands of such pipe are being run into or pulled from a well bore such as an oil or gas well.

Power pipe tongs of the type here involved must be durable and effective in their operation, but due to space limitations on drilling rig floors should desirably not occupy excessive space and should be well balanced and as light as reasonably consistent with the need for strength, but it is also desirable that the pipe tong be capable of handling a wide range of pipe sizes for making up and breaking out drill pipe tool joints, on the one hand, or making up and breaking out larger pipe or casing joints on the other hand.

Typically, tongs of the type here involved have included what may be characterized as an outer driven ring to which power is applied, an inner jaw carrying ring adapted to be rotated by the outer ring through jaw actuating means in the form of a cam and cam follower interposed between the jaws and the outer ring which force the jaws into gripping engagement with the pipe, whereupon the inner ring will thereafter rotate the pipe or tool joint. When the outer ring is reversed to open the jaws, stop means are provided to cause rotation of the inner ring with the outer ring after the jaws are opened, but in order to run the tong in the other direction, say to make up a joint of pipe, as distinguished from breaking out the joint, the stop must be reversed so that relative rotation of the outer ring may occur in the other direction.

Initial closure of the pipe gripping jaws in the operation of tongs of the type referred to above requires that the inner ring remain stationary during initial movement of the outer ring, but that the rings rotate as a unit after the pipe has been gripped. Ordinarily a brake band is employed to apply a braking action on the inner ring, the brake band being anchored on the supporting frame or housing. In some instances it may be impossible to make the jaws effectively grip the pipe if the brake does not apply sufficient drag to the inner ring to cause the pipe gripping means to take an effective bite.

SUMMARY OF THE INVENTION

Accordingly, an object of the invention is to provide a durable power tong for well pipe which is readily applicable to drilling rigs within the space limitations and which is effective to make up and break out pipe joints or couplings of a wide range of pipe sizes, from relatively small drill pipe tool joints to substantially larger drill collars and even larger casing. In accomplishnig this objective a jaw operating means is employed which occupies a comparatively small space radially of the pipe opening centrally of the tong, so as to minimize the outside diameter or major dimensions of the tong head, whereby to hold down the gross weight of the tong head, which must be suspended and manipulated over the rotary table of the rig as pipe is being run and pulled from the well.

Pursuant to the preceding objective, another object is to provide a tong head in which the jaws are carried by the inner ring and are actuated into pipe gripping positions by eccentrics driven by the outer ring during rotation of the latter, the jaws being pivotally carried by the inner ring in one embodiment and slidably radially in another embodiment.

Another object is to provide a reversible tong head for power tongs having reversible power means, so that the tong head may be driven in opposite directions to make up or break out pipe joints, the head having reverse stop means operable from a remote location to condition the head for operation in either direction.

Still another object is to provide a power tong head having means for adjusting the braking force applied to the inner ring to cause gripping of the pipe by the jaws, the brake means being operable from a remote location to assure sufficient braking force.

Other objects and advantages of the invention will be hereinafter described or will become apparent to those skilled in the art and the novel features of the invention will be defined in the appended claims.

BRIEF DESCRIPTION OF THE DRAWINGS

FIG. 1 is a top plan view showing a tong assembly made in accordance with the invention supported over a well bore;

FIG. 2 is a view in side elevation of the structure of FIG. 1;

FIG. 6 is a fragmentary view in horizontal section, as taken on the line 6—6 of FIG. 3;

FIG. 7 is a view in vertical section, as taken on the line 7—7 of FIG. 6, through the reverse stop operating means;

FIG. 8 is a fragmentary view in vertical section, as taken on the line 8—8 of FIG. 5, showing the reverse stop means coengaged;

FIG. 9 is a fragmentary view in horizontal section showing one of the jaws in gripping engagement with the pipe; and FIG. 10 is a fragmentary view in horizontal section showing a modified jaw construction.

DESCRIPTION OF THE PREFERRED EMBODIMENTS

Figure 3:
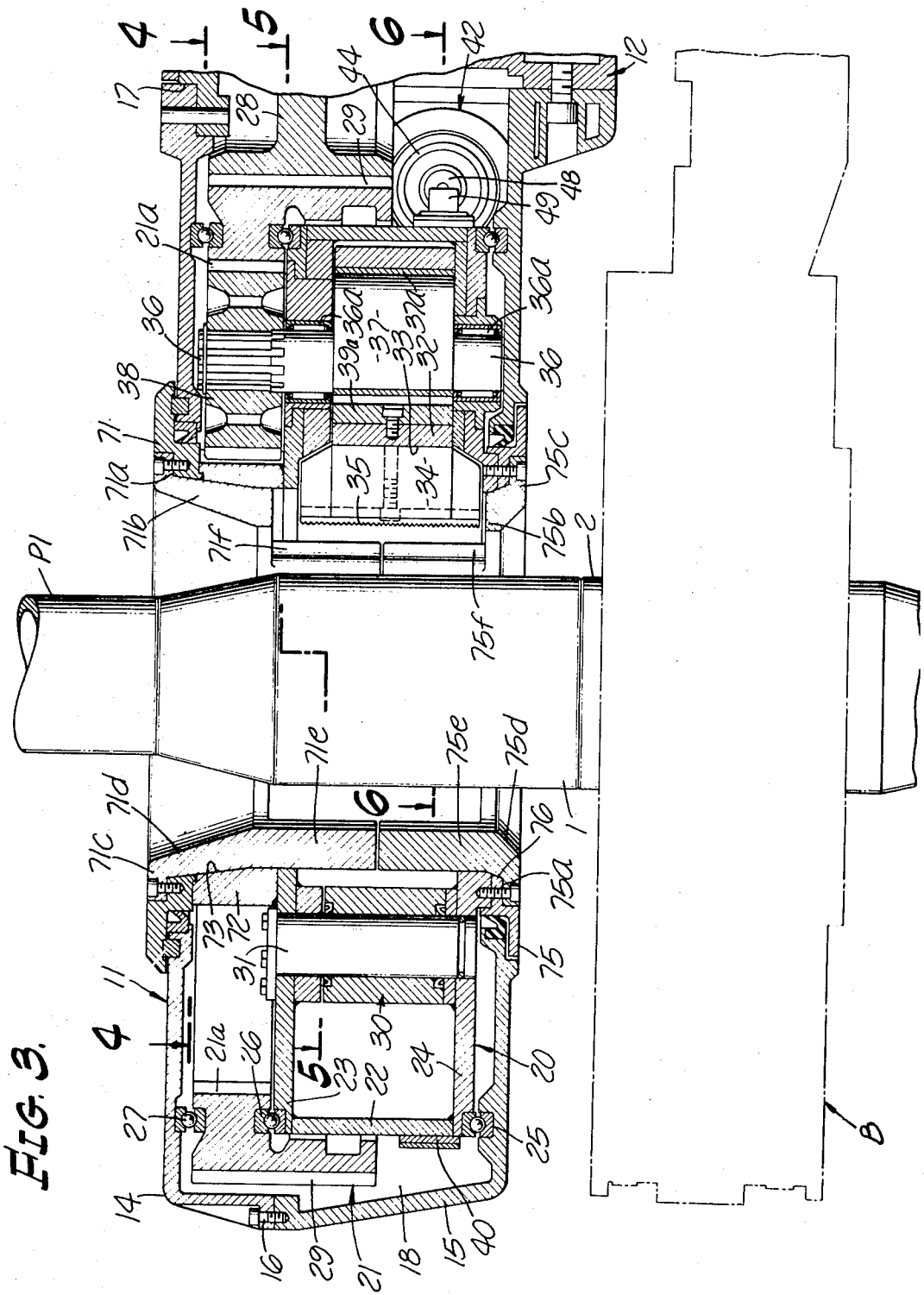
FIG. 3 is a fragmentary view in vertical section and on an enlarged scale, as taken on the line 3—3 of FIG. 1, certain of the parts being shown in elevation.

Referring first to FIGS. 1 and 2, there is generally illustrated a tong assembly T adapted to be supported above the floor F of a drilling platform which may be part of the usual drilling rig mounted above a well bore and into which pipe, such as drill pipe or casing, is adapted to be run and from which such pipe will be sometimes pulled, as in the case of drill pipe. Such a pipe is illustrated in FIGS. 1 and 2 as including an upper stand of pipe P1 in the illustrative form of a stand of drill pipe having a tool joint pin end 1 thereon adapted to be threadedly connected by the tong T to the box end 2 of a length or stand of the pipe P2 disposed in the well bore. In order to support the tong assembly T in an operative position above the well bore so that the stand of pipe P1 may be lowered therethrough for engagement with the pipe P2, a suitable crane C is provided, including a boom 3 projecting from a vertically disposed post 4. A cable 5 extends over sheaves 6, 6 and is connected to a pressure operated cylinder mechanism 7 disposed within the post 4, whereby the tong assembly T may be raised and lowered relative to the post 4 and thereby relative to the well bore into which or from which pipe is being removed. Also forming a part of the crane C is a rabbit 8 slidable vertically along the post 4, there being a second cable 9 also connected to the upper end of cylinder 7, extending over a sheave 10, and connected also to the rabbit 8 so that the mass of the tong assembly may be properly supported.

The tong assembly, as is typical of tongs of the type here involved, includes a head section generally denoted at 11 and a supporting and power transmission section generally denoted at 12. The latter section in the illustrative embodiment has a hydraulic motor 13 adapted to be connected to a suitable source of motive fluid under pressure so as to drive the transmission mechanism of the tong assembly, which may be of any desired type, but which may preferably be constructed in accordance with the disclosure in the application for United States Letters Patent filed concurrently herewith and entitled Power Pipe Tong Transmission Assembly, Ser. No. 687,815.

The tong head, as will hereinafter be described, is adapted to grip and effect rotation of the pin end 1 of the pipe P1, while the box end 2 of the pipe P2 is held non-rotatively in a back-up tong generally denoted at B. This back-up tong may be of any desired construction, but is preferably made in accordance with the disclosure in the application for United States Letters Patent filed concurrently herewith and entitled Back-Up Tong for Power Pipe Tongs, Ser. No. 687,810.

Referring now more particularly to FIG. 3, the tong head assembly will be seen to comprise a frame structure including a horizontally split case having an upper case section 14 and a lower case section 15 joined as by fasteners 16 and connected at 17 to power transmission section 12 of the tong assembly. The case provides an internal annular space 18 in which is revolvably disposed what, as will hereinafter appear, may be characterized as a pipe engaging and rotating head, including an inner ring assembly 20 and an outer ring assembly 21, which are supported one relative to the other for relative rotation of the rings as well as for rotation of the rings as a unit within the tong case.

The inner ring 20 comprises a box-like structure comprising an outer annular wall 22, an upper wall 23 and a bottom wall 24. Supporting the inner ring for rotation within the case is an annular bearing 25 and, at the upper side of the inner ring is an annular bearing 26 on which is revolvably disposed the outer ring 21, an additional annular bearing 27 being provided between the upper case section 14 and the outer ring 21. The outer ring 21 is adapted to be driven by a gear 28 which constitutes the driven gear of the transmission mechanism powered by the motor 13 previously described, it being unnecessary for the purpose of the present disclosure to show a specific power transmission mechanism whereby to rotatively drive the gear 28. This gear 28 constitutes means for driving rotatively the outer ring 21, and, therefore, the latter is provided with teeth 29 in mesh with the teeth of gear 28. The inner ring 20 is provided with pipe gripping means operable in response to rotation of the outer ring 21 relative to the inner ring 20, such pipe gripping means being best illustrated in FIGS. 3, 4, 5 and 9 and a modified form of the gripping means being illustrated in FIG. 10.

In the embodiment now being described, the pipe gripping means include a plurality of circumferentially spaced jaws 30 in the form of levers pivotally supported on vertical pins or shafts 31 which are, as seen in FIG. 3, supported between the inner ring top and bottom walls. Jaw 30 has an enlarged end section 32 provided with a dovetailed slot 33 adapted to receive a pipe gripping die carrier 34, in which may be removably disposed a typical tong die 35 adapted to grip the pipe or tool joint 1, previously referred to, upon pivotal movement of the jaws 30 toward one another about their respective pivot pins 31. The die carriers 34 may range in size, that is in thickness between the base of the slot 33 and the gripping jaws of the die 35, so that the assembly is adapted to effectively grip pipe over a wide range of sizes, from relatively small drill pipe tool joints to much larger casing.

Means are provided for effecting inward movement of the jaws 30 as well as outward movement of the jaws in response to rotation of the outer ring 21 relative to the inner ring 20. In the present embodiment, such means is so constructed as to require substantially a minimum outside diameter in the tong head assembly so as to substantially minimize the gross weight of the tong head, so as to facilitate utility of the tong assembly on drilling rigs having space limitations and so as to facilitate the manipulation of the tong assembly during its use. Such manipulation of the tong assembly in a typical installation would involve the periodic raising and lowering of the tong assembly by the crane C between a lower position, not shown, at which the tool joint 2 of FIG. 2 would extend upwardly through the tong assembly so as to be engaged by an elevator, on the one hand, and an upper position at which the tool joint 2 of the pipe P2 will be engaged by the back-up tong b and held stationary as the tong head 11 is operated to make up a pipe joint comprising the tool joints 1 and 2. Thus it will be apparent that the tong assembly will be shifted between these two positions many times during the running of a string of drill pipe, which may be thousands of feet long, composed of short stands of the pipe. Moreover, inasmuch as the supporting mechanism, including the crane which supports the tong assembly in operative position, must be at all times out of the way when the elevator is moving pipe into and out of the hole, it will be recognized that the tong head should preferably be as light as possible, offering no more than the necessary weight hanging over the hole and requiring constant manipulation.

Figure 4:
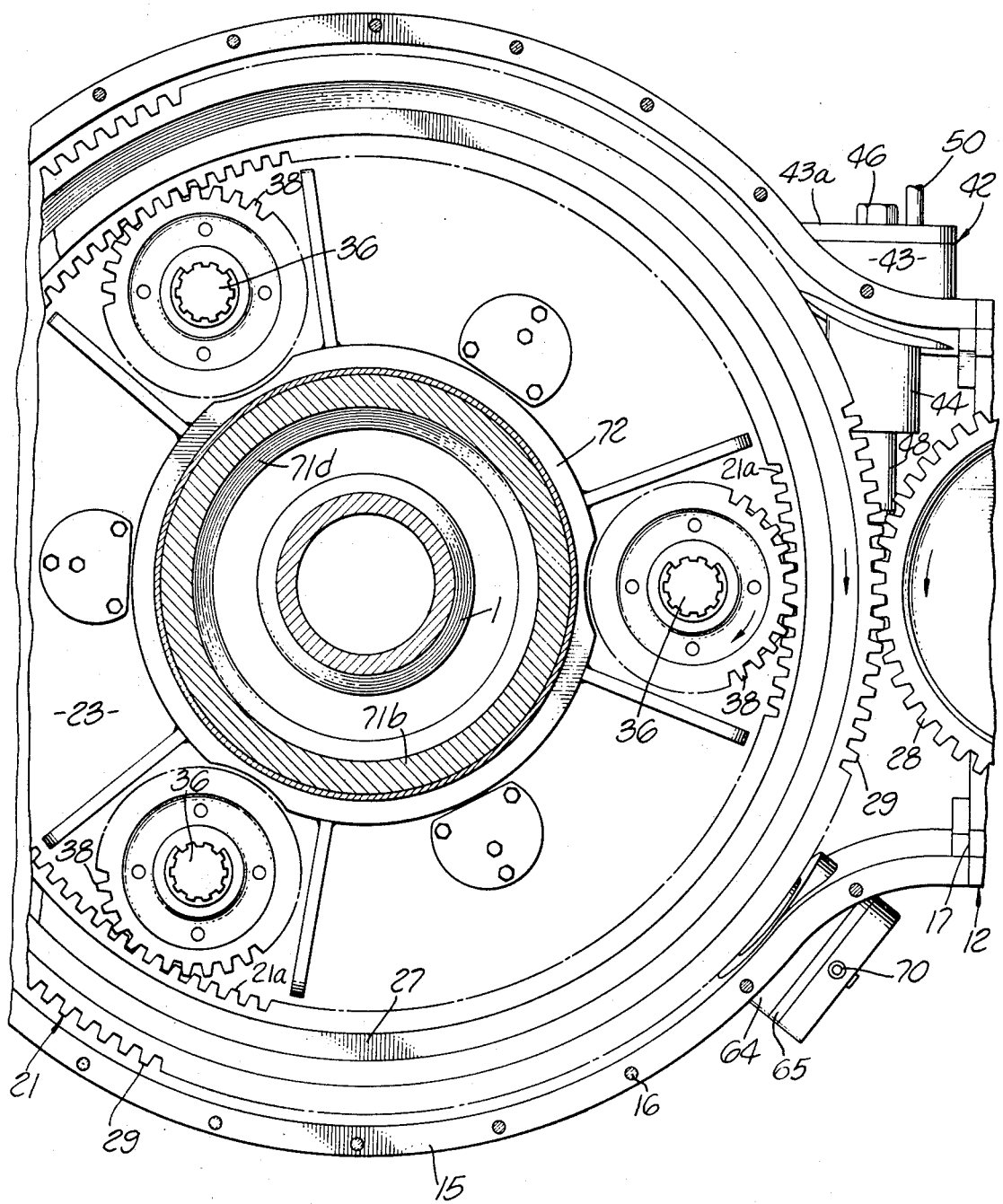
FIG. 4 is a fragmentary view in horizontal section, as taken on the line 4—4 of FIG. 3.
Figure 5:
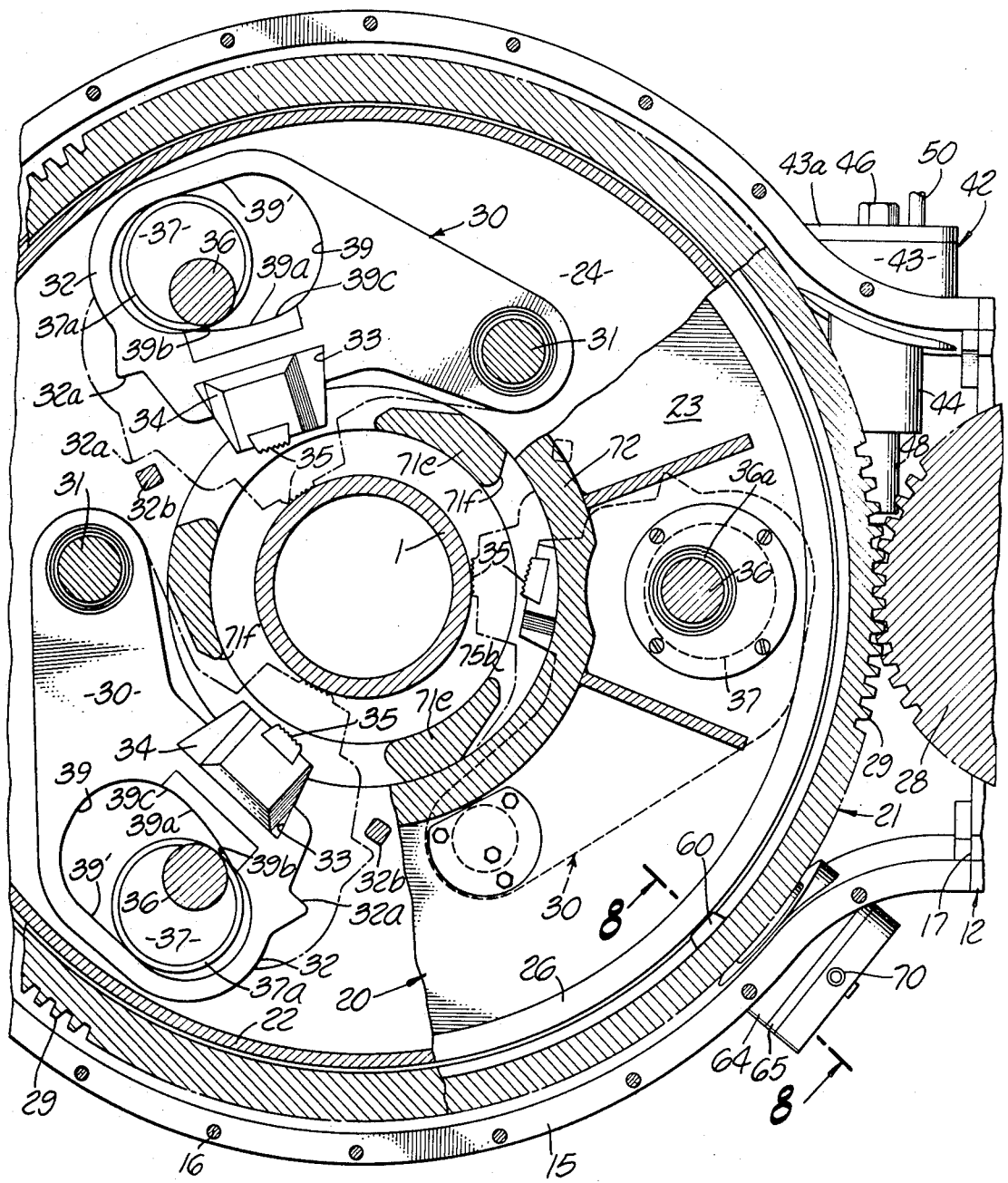
FIG. 5 is a fragmentary view in horizontal section, as taken on the line 5—5 of FIG. 3.

Accordingly, the jaw actuating mechanism comprises, for each jaw, a shaft 36 journalled in the upper and lower walls 23 and 24 of the inner ring 20 and having thereon an eccentric 37 disposed in an elongated slot 39 in the respective jaws 30. If desired, the slot 39 may be provided with a wear pad 39a engageable by the eccentric 37. It will be appreciated upon reference to FIGS. 5 and 6 more particularly, in which the jaws 30 are shown in retracted positions, that rotation of the shafts 36, and therefore the eccentrics 37, in either direction will cause inward pivotal movement of the jaws 30 toward the pipe or joint located within the tong head. Means are provided for effecting such pivotal movement including, as best seen in FIGS. 3 and 4, planetary gears 38 splined or otherwise connected to each of the shafts 36 and in mesh with internal teeth 21a provided in the outer ring 21. It will now be apparent that rotation of the outer ring 21 will effect simultaneous rotation of each of the gears 38 with resultant rotation of the eccentric supporting shafts 36, provided that a drag be applied to the inner ring assembly so that the inner ring will not initially rotate along with the outer ring 21.

In the embodiment of the invention as shown in FIGS. 3, 5, 6 and 9, means are provided whereby to minimize frictional resistance to the forceable pivotal movement of the jaws 30 into gripping engagement with the pipe. Accordingly, each of the eccentrics 37 is provided with an anular member 37a in the illustrative form of a bushing which constitutes a bearing rotatably mounted upon the body of the eccentric 37. In addition, the eccentric supporting shafts 36 are rotatably supported in bearings 36a. With such a construction, the eccentric will revolve within the bushing 37a which will rotatably engage the surface of the wear pad 39a.

The wear pad 39a is so constructed as to enable the application of a substantially uniform radial force to the pipe gripping jaws, both in making up and breaking out pipe joints, notwithstanding the fact that the jaws 30 swing about the pivot supports 31 so as to normally tend to vary the effective cam angle beween the eccentric 37 and the wear pad 39a when the eccentric is caused to revolve in opposite directions. More specifically, the wear pad 39a is provided with an arcuate cam surface which progressively declines from its outer extremity towards the pivot end of the jaws 30. Included in the surface of the wear pad 39a is a first portion 39b and a second portion 39c, the eccentric 37 acting on the portion 39b when rotated in a left-hand direction to effect closure of the respective jaws, and the eccentric 37 working on the portion 39c upon right-hand rotation of the eccentric to effect closure of the respective jaws. Rotation of the eccentrics 37 past the juncture of the camming surface portions 39b and 39c in either direction commences the reopening of the jaws, and therefore the die carriers 34 and dies 35 should be selected so as to effect gripping engagement with a pipe before the eccentrics 37 reach their position of maximum throw. When die carriers 34 are selected which will effect such gripping engagement of the pipe just prior to the point at which the eccentrics reach the position of maximum throw, as seen in FIG. 9, the greatest radial force will be imposed on the jaws for the purpose of effecting high torque in making up and initial breaking out of pipe joints.

Means are provided for applying a drag to the inner ring 20, including a brake band 40 engaged with the outer annular wall 22 of the inner ring and suitably anchored as at 41 to the case section 15. In accordance with the present invention, means are provided for applying more or less braking force to the brake band 40, such means comprising, as best seen in FIG. 6, a brake actuator mechanism generally denoted at 42. This mechanism includes a supporting body 43 welded or otherwise made a part of the tong case and having therein a hydraulic actuator, including a cylinder 44 in which is reciprocally disposed a piston 45. Carried by the body 43 and revolvable in an end closure 43a is a brake adjuster screw 46 threadedly engaged in a hollow tube 46a disposed within a bore in the piston 45. This hollow tube 46a engages a stack of Belleville washers 47 constituting a spring engaged at one end with the tube 46a and at the other end with a piston extension 48, the extension 48 being welded or otherwise suitably connected to an anchor 49 at the other end of the brake band 40 from the anchor 41 whereby to maintain a normal constant braking force on the inner ring 20 sufficient to normally prevent rotation of the inner ring along with the outer ring 21, whereby, under normal circumstances, the rotation of the outer ring will cause actuation of the jaws 30 into and out of engagement with the pipe in response to reversals in the direction of rotation of the outer ring 21. In the event that additional braking force is necessary or desirable in order to establish or maintain a pipe gripping action, fluid under pressure may be supplied to the actuator cylinder 44 through a conduit 50 from a source of fluid pressure (not shown).

When the inner ring 20 is held stationary, the normal tendency of the jaw actuating means would be to move the jaws inwardly during the first 180° of revolution of the eccentrics 37 until the dies 35 engage a pipe in the central tong opening or, in the absence of such a pipe, to move the jaws inwardly during the first 180° of rotation of the eccentrics 37 and then retract the jaws cyclically; and the inner ring 20, under these circumstances, would not rotate with the outer ring 21. In the presence of a pipe within the tong opening, the eccentrics 37 will move the jaws into engagement with the pipe during rotation of the outer ring 21 in one direction; but, when it is desired to reopen the jaws, it is necessary to rotate the outer ring 21 in the opposite direction, the eccentrics 37, due to the fact that they are within the slot 39, acting on the slot wall 39' to positively retract the jaws.

Stop means are provided to prevent cycling of the jaw actuation. This stop means, in this specific embodiment, includes reversing stop means which will function to limit relative rotation of the inner and outer rings in one direction or the other, depending upon whether joints are being made up or broken out, to a position at which the jaws are fully opened. This stop means also includes, in the illustrative embodiment, stop means for preventing movement of the jaws inwardly in the event that no pipe joint is present between the jaws. This latter stop means cooperates with the reversing stop means so as to eliminate the possibility that, for example, a joint which has been made up will be re-engaged by the jaws as a result of cycling of the eccentric means and cause the joint to be partially broken out.

More particularly, the reversing stop means is best illustrated in FIGS. 6, 7 and 8. The reverse latch means includes a latch support 51, recessed in the outer wall 22 of the inner ring 20 and providing a chamber 52 in which is reciprocably disposed a stop body 53 having a V-shaped outer extremity 54 normally biased outwardly by a spring 55 to a position underlying the lower extremity of the outer ring 21. A pin 56 carried by the body 53 and sliding in a slot 57 is adapted to limit outward projection of the stop body. The stop body 53 has a further outward projection 58 which normally extends into an inner groove 59 in the outer ring 21. Cooperative with the outward projection 58, as best seen in FIG. 8, is a stop anvil 60 carried by the outer ring 21 and extending vertically across the just-mentioned groove 59, the anvil being retained in place within the outer ring 21 by a pin 62 and by angularly spaced lugs 63 between which the anvil is fit. It will now be apparent that the anvil will abut with the stop projection 58 at one side or the other of the latter, depending upon the direction of relative rotation between the inner and outer rings 20 and 21, respectively. In operation, however, it is desired that during the making up of pipe joints the anvil be at one side of the stop projection 58 so as to limit relative rotation between the inner and outer rings to a position at which the jaws are open, while during the operation of breaking out joints of pipe it is desired that the anvil normally be at the other side of the stop projection 58. Accordingly, means are provided for shifting the stop body 53 inwardly to retract the stop projection 58 from groove 59 in the outer ring, whereby to allow the anvil 60 to pass by the stop projection 58. The means for shifting the stop body 53 comprises means which are remotely operable and, in the lower case section 15 of the illustrative embodiment, includes an actuator cylinder 64 carried by the tong head frame 11 and having an internal piston support 65 providing a piston chamber 66, in which is reciprocable a piston 67. This piston 67 supports a roller 68, and spring means 69 are provided for normally biasing the piston 67 outwardly in the chamber 66. However, the roller 68 is located at an elevation relative to the outward projection 54 of the stop body 53 such that, upon inward movement of the piston 67, the roller will be contacted by the projection 54 to force the stop body 53 inwardly in its chamber 52, thereby retracting the stop projection 58 out of the path of the stop anvil 60. Such inward movement of the piston 67 is accomplished by the application of fluid pressure to the piston chamber 66 through a conduit 70 leading from a source of fluid pressure at a remote location (not shown). In the normal operation of the tong assembly, the stop anvil 60 will be at a starting position adjacent one side of the stop projection 58 when pipe joints are to be broken out, so that the outer ring 21 will be free to rotate relative to the inner ring 20 to the extent necessary to effect actuation of the jaws 30, as aforesaid, into engagement with a pipe disposed in the tong opening and, thereafter, the inner and outer rings will rotate together as a unit, overcoming the drag of the brake band 40. When it is desired to release the pipe or open the jaws, and the outer ring 21 is caused to rotate in the opposite direction, the anvil 60 will re-engage the stop projection 58 and cause rotation of the inner and outer rings together when the jaws are in the full open position.

In order to assure that the jaw actuating eccentrics 37 cannot cycle in the absence of a pipe within the tong opening, thereby allowing movement of the stop anvil 60 away from the stop projection 58 a distance greater than that required to effect inward movement of the jaws the maximum extent, the jaws are provided with stop projections 32a engageable with a stop member 32b to limit the maximum inward pivotal movement of the jaws, this stop member 32b being in the form of a bar or rod straddling the box-like inner ring assembly and welded or otherwise fixed in place. See FIGS. 5 and 6.

It will now be understood that, inasmuch as with the stop means just described, namely the stop elements 32a and 32b, the jaws are prevented from moving inward to such an extent that the eccentrics 37 may pass over their positions of maximum throw; the outer ring 21 will be prevented from rotating relative to the inner ring 20 to such an extent that the jaw actuating eccentrics will cause reclosure of the jaws upon a pipe in the tong opening when the jaws are being opened. Thus, a pipe joint which has been made up cannot possibly be partially broken out inadvertently, and vice versa.

In order to protect the assembly and to assist in the guiding of the pipe P1 into the central tong opening, an upper guide is provided comprising a flange 71 positioned above the case section 14 and having a skirt 72 extending into the case and providing a tapered guide surface 73, whereby the pipe P1 will be guided into the tong opening as the pipe is lowered into a position for engagement of the jaws with the pipe P1 or the tool joint pin end 1, as best seen in FIGS. 3 to 7. The flange 71 and the guide member 72 are welded or otherwise made a part of the inner ring 20 and a seat is provided at 71a adapted to accommodate reduced diameter guides of different sizes which will serve to guide smaller diameter pipes and centralize them relative to the tong opening so as to protect the jaws and die holders carried thereby, which extend more or less into the tong opening when die holders of different radial dimensions are employed for handling different sizes of pipe. A reduced guide is herein illustrated whereby the die carriers 34 will be protected, such reduced guide comprising a body 71b having an upper flange 71c adapted to seat in the seat 71a, the body 71b having an internal taper 71d, and the body also having depending arms 71e which define windows 71f through which the jaws may pass for engagement of the pipe disposed within the tong opening. Another guide flange 75 is disposed beneath the tong assembly and provides a guide surface 76 to assist in guiding a pipe upwardly into the tong opening, as well as a seat 75a adapted to accommodate lower guides of smaller size. A similar reduced bottom guide is illustrated and includes a body 75b having a bottom flange 75c seating in the seat 75a of the bottom guide, the body 75b also having a tapered surface 75d, as well as upwardly extended arms 75e defining windows 75f. The arms 71e and 75e are disposed in alignment, as are the windows 71f and 75f, whereby the pipe joints are prevented from moving laterally while disposed in the tong opening into positions at which they might otherwise hang up upon the guide bodies.

In the normal operation of the tong assembly when it is desired to make up pipe joints, the pipe P2 will be engaged and held stationary by the back-up tong B and the pipe P1 will be lowered or speared into the pipe P2. Thereupon, fluid pressure will be supplied to the motor 13 to drive the outer ring 21 in a clockwise, right-hand direction, thereby, through the intermediary of the planetary gears 38, causing rotation of the eccentric shafts 36 and inward movement of the jaws about their pivots 31 until the tong dies engage the tool joint pin end 1, rotation of the jaw carrying inner ring along with the outer ring being prevented by the brake band 40 until the jaws tightly grip the pipe, at which time the inner and outer rings will rotate together to effect rotation of the pipe. After the pipe joint has been made up the motor 13 will be reversed, causing rotation of the outer ring 21 in a left-hand direction as the brake band 40 holds the inner ring 20 stationary. Such relative rotation will cause the jaws to be opened and will cause the stop anvil 60 to engage stop projection 58, thereby resulting in unitary rotation of the inner and outer rings to the left with the jaws in the full open position. The operation may be repeated until it is desired to break out a joint of pipe. In order to enable this latter operation, fluid under pressure will be supplied to the reverse stop actuator chamber 66 causing retraction of the stop projection 58 from the groove 59 in the outer ring 21 and, at the same time, the motor will be operated to drive the outer ring 21 in a left-hand direction so as to move the stop anvil 60 past the stop projection 58. Due to the presence of the secondary stops 32a and 32b, relative rotation of the outer ring and the inner ring in this direction is limited to a distance less than a full cycle of the eccentrics 37, inasmuch as the jaws are prevented from moving inwardly by engagement of stop 32a with 32b; and, when the direction of rotation of the outer ring is again reversed to reopen the jaws, the rings will rotate again together when the stop anvil 60 re-engages the stop projection 58, respectively carried by the outer ring and the inner ring. Thus, the tong head is conditioned for breaking out joints.

Referring to FIG. 10, a modified gripping jaw is illustrated. In this embodiment, the jaw designated 130 is reciprocably disposed in a jaw guide 131 defined between the bottom wall 24 of the inner ring 20 and the upper wall thereof by a pair of vertical guide plates which define a radially extended opening 130a. The jaw 130, as in the previously disclosed embodiment, is provided with a slot 139 in which an eccentric 137 is engageable with an inner wall 139a provided by a wear resistant insert 138 and with an outer wall 139' whereby the eccentric, upon rotation of its shaft 136, will effect radial sliding movements of the jaw 130. This jaw 130, like the previously described pivotal jaws 30, is provided with a die carrier 134 having therein a tong die 135 adapted for gripping engagement with the pipe. A plurality of such jaws 130 will be slidably supported by the inner ring and the function thereof is essentially the same as that of the pivoted jaws 30, with the exception that the pipe contacting faces of the dies 135 will, through the entire range of pipe sizes, always approach the pipe in the same relationship, whereas the pivoted jaw supporting dies 35 of the previously described embodiment change their angular relationship to the pipe when the pipe size is different. It will be noted that in the structure of FIG. 10 the wear pads 138 provide a non-changing cam angle in relation to the eccentrics 137, inasmuch as the wear pads 138 provide a surface 139a disposed at a right angle to the direction of movement of the jaws 130 towards and away from the pipe. However, to minimize frictional resistance to actuation of the jaws 130, the eccentrics 137 and the supporting shafts 136 therefor may be, as previously described, respectively provided with a rotatable bushing or bearing and bearing supports.

In addition, the jaw construction of FIG. 10 also includes secondary stop means for preventing cycling of the eccentric 137. In this embodiment, the jaws 130 are provided with stop lugs 132a engageable with end walls 132b of the guide plates 131.

We claim:

1. In a power pipe tong assembly including power operated drive means, a tong head including an outer drive ring, an inner ring, means supporting said rings for relative rotation and for rotation as a unit in response to operation of said drive means, said rings having a pipe opening therethrough, pipe gripping jaws carried by said inner ring and shiftable between retracted positions and pipe gripping positions in said opening, means for moving said jaws to said pipe gripping positions including eccentric members engaged with said jaws, means for driving said eccentric members in response to rotation of said outer ring relative to said inner ring in one direction, and means for retracting said jaws responsive to rotation of said outer ring relative to said inner ring in the other direction.

2. A power pipe tong as defined in claim 1, wherein said means for driving said eccentrics comprise gears connected to said eccentrics and driven by said outer ring.

3. A power pipe tong as defined in claim 1, wherein said outer ring comprises a ring gear, and said means for driving said eccentrics comprise planetary gears connected to said eccentrics and engaged with said ring gear.

4. A power tong as defined in claim 1, wherein said means for retracting said jaws comprise surfaces on said jaws engaged by said eccentrics.

5. A power tong as defined in claim 1, wherein said jaws comprise levers pivotally mounted on said inner ring and pivotable between said retracted and said pipe engaging positions.

6. A power tong as defined in claim 1, wherein said inner ring comprises radially extended jaw guides and said jaws are slidable in said guides between said retracted and said pipe engaging positions.

7. A pipe tong as defined in claim 1, wherein stop means are provided for limiting relative rotation of said outer ring relative to said inner ring to a position at which said jaws are in retracted positions.

8. A pipe tong as defined in claim 7, wherein said stop means comprise a stop on said inner ring and a stop on said outer ring, and including means for moving one of said stops to a position enabling movement of the other of said stops past said one of said stops to selectively limit rotation of said outer ring relative to said inner ring in opposite directions to said positions at which said jaws are retracted.

9. A pipe tong as defined in claim 7, wherein said stop means comprise a stop on said inner ring and a stop on said outer ring, and including means for moving one of said stops to a position enabling movement of the other of said stops past said one of said stops to selectively limit rotation of said outer ring relative to said inner ring in opposite directions to said positions at which said jaws are retracted, said means for moving said one of said stops including a pressure cylinder, and a piston in said cylinder engageable with said one of said stops upon the application of fluid under pressure to said cylinder to move said one of said stops to said position enabling movement of said other of said stops therepast.

10. A power pipe tong as defined in claim 1, wherein brake means are provided for normally holding said inner ring against rotation with said outer ring, said brake means allowing rotation of said rings together when said jaws are engaged with a pipe.

11. A power pipe tong as defined in claim 1, wherein means are provided for adjusting the braking force of said brake means.

12. A pipe gripping and rotating head for power driven pipe tongs adapted to make up and break out well pipe joints upon rotation of said head in opposite directions, comprising: a ring gear having external means engageable by a power input drive, an inner ring assembly disposed within said ring gear for relative rotation thereof, said inner ring assembly including a plurality of planetary gears within said ring gear and in mesh therewith, shafts driven by said planetary gears, eccentrics carried by said shafts, pipe gripping jaw means shiftably carried by said inner ring assembly, and said eccentrics and said jaw means having coengaged surfaces for forcing said jaws inwardly of said inner ring assembly in response to relative rotation of said ring gear and said inner ring assembly.

13. A pipe gripping and rotating head for power driven pipe tongs as defined in claim 12, wherein said pipe gripping means comprises levers pivotally mounted on said inner ring assembly.

14. A pipe gripping and rotating head for power driven pipe tongs as defined in claim 12, wherein said inner ring assembly includes radially extended guides spaced circumferentially thereof, and said pipe gripping means includes jaws slidable in said guides.

15. A pipe gripping and rotating head for power driven pipe tongs as defined in claim 12, wherein said pipe gripping jaw means include additional surfaces engageable by said eccentrics to retract said gripping means.

16. A pipe gripping and rotating head for power driven pipe tongs as defined in claim 12, including stop means for limiting relative rotation between said ring gear and said inner ring assembly in one direction.

17. A pipe gripping and rotating head for power driven pipe tongs as defined in claim 16, wherein said stop means comprise coengageable stop members respectively carried by said ring gear and by said inner ring assembly and engageable with one another to limit relative rotation between said ring gear and said inner ring assembly to a position at which said gripping means are retracted.

18. A pipe gripping and rotating head for power driven pipe tongs as defined in claim 16, wherein stop means comprise coengageable stop members for preventing relative rotation of said ring gear and said inner ring assembly when said gripping means are moved inwardly without engaging a pipe therein.

19. A power pipe tong as defined in claim 1, wherein said eccentric members are each provided with a member rotatable about said eccentrics and engaged with said jaws for moving said jaws.

20. A power pipe tong as defined in claim 1, wherein said jaws are pivotally supported for movements between said positions, and said jaws are provided with camming surfaces engaged by said eccentrics, said camming surfaces having portions for effecting movement of said jaws to said gripping positions upon rotation of said eccentrics in opposite directions, and one of said portions providing a declining camming surface.

21. A power pipe tong as defined in claim 1, wherein said jaws are pivotally supported for movements between said positions, and said jaws are provided with cam surface means engaged by said eccentrics for applying a substantially uniform pipe gripping force to said jaws upon rotation of said eccentrics in either direction.

References Cited
UNITED STATES PATENTS

| | | | |
|---|---|---|---|
| 3,261,241 | 7/1966 | Catland | 81—57.18 |
| 3,380,323 | 4/1968 | Campbell | 81—57.16 |
| 3,086,413 | 4/1963 | Mason | 81—57.16 |

JAMES L. JONES, JR., Primary Examiner

U.S. Cl. X.R.

81—57.2